(No Model.)
G. W. COPE.
DAMPER FOR STOVES.
No. 590,431. Patented Sept. 21, 1897.
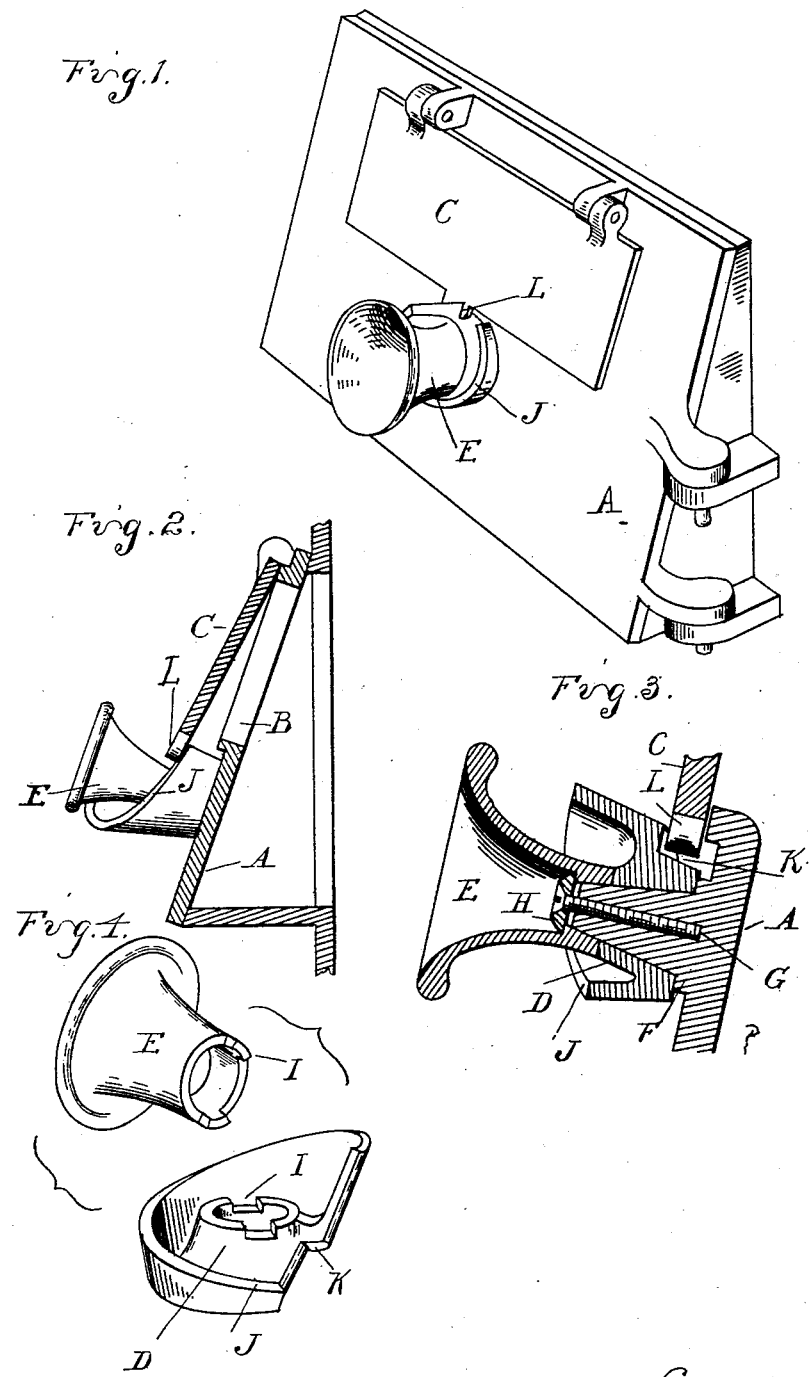

UNITED STATES PATENT OFFICE.

GEORGE W. COPE, OF DETROIT, MICHIGAN, ASSIGNOR TO FRED SATTLER, OF BELLEVILLE, ILLINOIS.

DAMPER FOR STOVES.

SPECIFICATION forming part of Letters Patent No. 590,431, dated September 21, 1897.

Application filed March 11, 1897. Serial No. 626,962. (No model.)

*To all whom it may concern:*

Be it known that I, GEORGE W. COPE, a citizen of the United States, residing at Detroit, in the county of Wayne and State of Michigan, have invented certain new and useful Improvements in Stove-Dampers, of which the following is a specification, reference being had therein to the accompanying drawings.

The invention consists in the construction of a draft-door or damper for stoves, and consists particularly in the construction of such a damper applied to ash-pit doors and in the means for opening the damper and holding it at any desired degree of opening and of closing the damper and locking it closed, this being effected by a single actuating piece, shaft, or spindle, as more fully hereinafter described.

In the drawings, Figure 1 is a perspective view of an ash-pit door, showing the damper in its closed and locked position. Fig. 2 is a cross-section through the ash-pit door, showing the damper partially open. Fig. 3 is a vertical section through the actuating and locking spindle or shaft, the damper being shown in its closed position. Fig. 4 is a detached perspective view of the parts of which the locking spindle or shaft is composed as I preferably construct it.

A is an ash-pit door, which preferably is inclined and suitably hinged, as shown, to close the usual opening in the ash-pit. This door is provided with a draft-opening B, which is controlled by the hinged damper or door C, which will close by gravity. This damper is opened and held open or closed by a single actuating shaft or spindle, preferably of the following construction.

D is the body of the spindle, and this preferably is made in two parts, the handle portion E being made separate from the body portion proper simply for convenience of casting and to make it more readily attachable and detachable.

F is a pin projecting from the ash-pit door below the damper, preferably tapering and engaged in a suitable socket or recess in the body of the shaft or actuating-spindle. The spindle is held to the ash-pit door or to this pin preferably by means of a screw G passing through an aperture in the end of the handle portion E, which is hollow, as shown, and by means of an enlarged head or washer H clamps the device onto the pin and at the same time holds the two parts of the spindle together, the two parts being provided with interlocking portions and teeth or recesses, such as I, so that the turning of the handle will turn the body portion of the spindle.

Around the spindle is a spiral way or cam J, upon which rests the lug or flange L of the damper, so that as the spindle is turned to the left, as shown in the drawings, the spindle way or cam will raise the damper to open the same until it reaches the highest point, when a further movement will cause it to drop off to its closed position. It is evident that when the damper is opened to any point on the spiral flange it will remain open in that adjusted position until the spindle is again adjusted and that reversing the movement of the spindle will correspondingly close or open the damper after it has once started up the incline. In the closed position of the damper the lug L rests at the foot of the incline.

Beyond the spiral way J and in the highest portion thereof at the base is formed a locking notch or recess K so arranged that when the damper is in its closed position the turning of the spindle to the right will carry the shoulder or flange K over the lug, the face of which is inclined, and tightly lock the damper in its closed position. Thus by the opposite rotation of the same spindle I am enabled to open or close and lock this damper. In practice this has proven to be a construction of considerable merit and of great desirability for the purpose to which it is applied.

It will be noted that the lug L is on the side of the damper opposite to the hinges, and consequently as the damper is opened or closed the lug moves in the arc of a circle having its center in the axis of the hinges and in opening constantly moves away from the pin or stud F. Therefore to insure the constant engagement of the lug L with the helical flange the spindle-body on which the flange is formed is made in the form of an inverted truncated cone.

What I claim as my invention is—

1. In a damper-operating device, the combination with a support and a hinged damper having a projection thereon opposite its hinged edge, of means for operating the damper, comprising a truncated conical body having a helical flange thereon arranged to project and work below the damper projection, a handle on the body, and a means for pivotally securing the operator on the support, substantially as described.

2. The combination with a hinged damper and the support therefor having thereon a stationary stud or pin adjacent the damper, and an operating device for the damper comprising a hollow spindle rotatively mounted on said stud or pin, and provided with a helical flange adapted to engage a projection on the damper and also provided with a notch or recess I, a hollow handle portion also rotatively mounted on said stud or pin and provided with a projection fitting in said notch or recess, and a bolt or screw secured in said stud or pin and provided with means engaging an internal shoulder on the handle portion for holding the latter on the stud and the projection in the notch or recess I, substantially as described.

In testimony whereof I affix my signature in presence of two witnesses.

GEORGE W. COPE.

Witnesses:
JAMES WHITTEMORE,
M. B. O'DOGHERTY.